(No Model.) 3 Sheets—Sheet 1.

J. BACH.
POTATO SEPARATOR.

No. 553,891. Patented Feb. 4, 1896.

Witnesses,
W. L. Pushong.
Will Hafer.

Inventor,
John Bach
By Joseph A. Minturn
His Attorney.

(No Model.) 3 Sheets—Sheet 2.
J. BACH.
POTATO SEPARATOR.
No. 553,891. Patented Feb. 4, 1896.
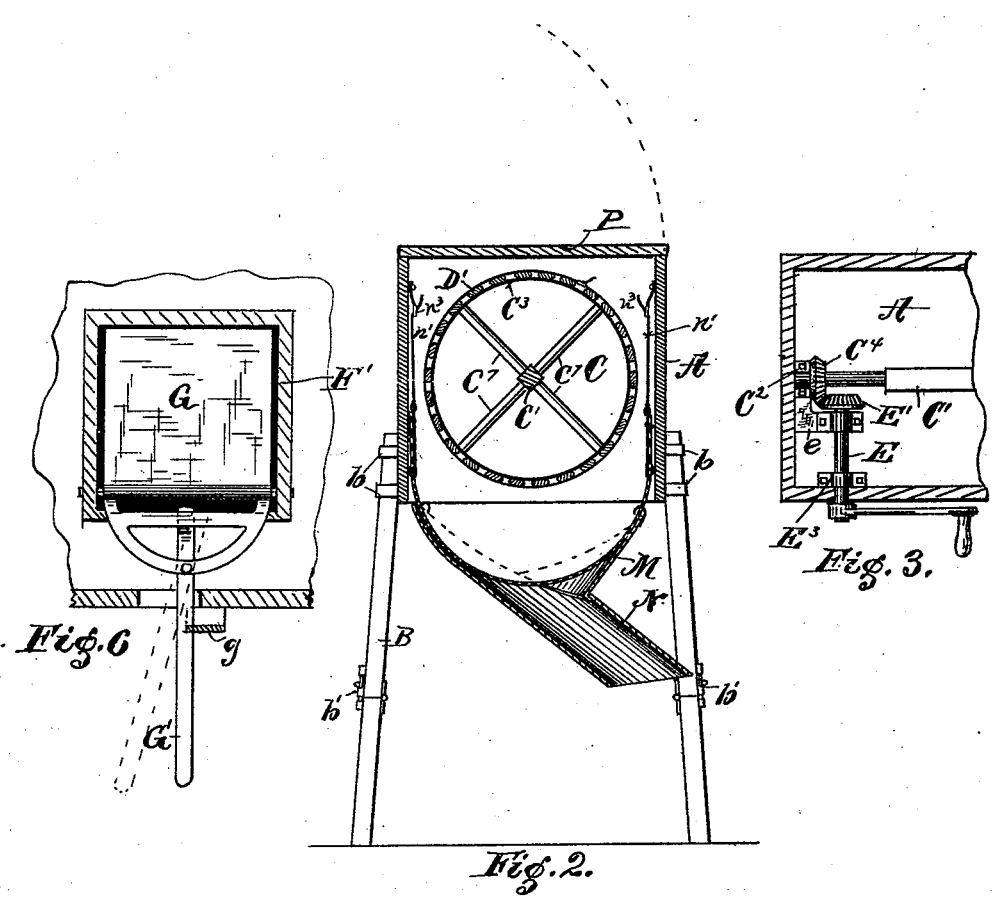
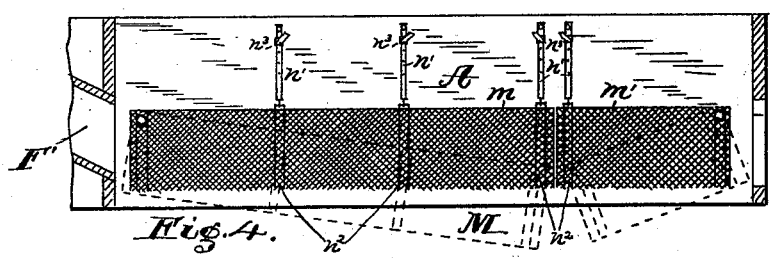
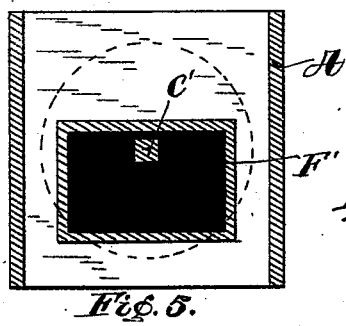
Witnesses:
W. L. Bushong.
Will Hofer.
Inventor,
John Bach
By Joseph A. Minturn
His Attorney, (No Model.) 3 Sheets—Sheet 3.

J. BACH.
POTATO SEPARATOR.

No. 553,891. Patented Feb. 4, 1896.

Witnesses,

Inventor,
John Bach,
By Joseph A. Minturn,
His Attorney.

UNITED STATES PATENT OFFICE.

JOHN BACH, OF INDIANAPOLIS, INDIANA.

POTATO-SEPARATOR.

SPECIFICATION forming part of Letters Patent No. 553,891, dated February 4, 1896.

Application filed November 16, 1894. Serial No. 528,985. (No model.)

*To all whom it may concern:*

Be it known that I, JOHN BACH, a citizen of the United States, residing at Indianapolis, in the county of Marion and State of Indiana, have invented certain new and useful Improvements in Potato-Separators; and I do hereby declare the following to be a full, clear, and exact description of the invention, such as will enable others skilled in the art to which it appertains to make and use the same.

The object of this invention is to provide a machine whereby vegetables, fruit and other articles, which are sufficiently spherical to roll, may be separated into lots containing only certain sizes and the labor and tedious delay of hand-sorting wholly obviated.

I accomplish the objects of the invention by the mechanism illustrated in the accompanying drawings, in which—

Figure 7:
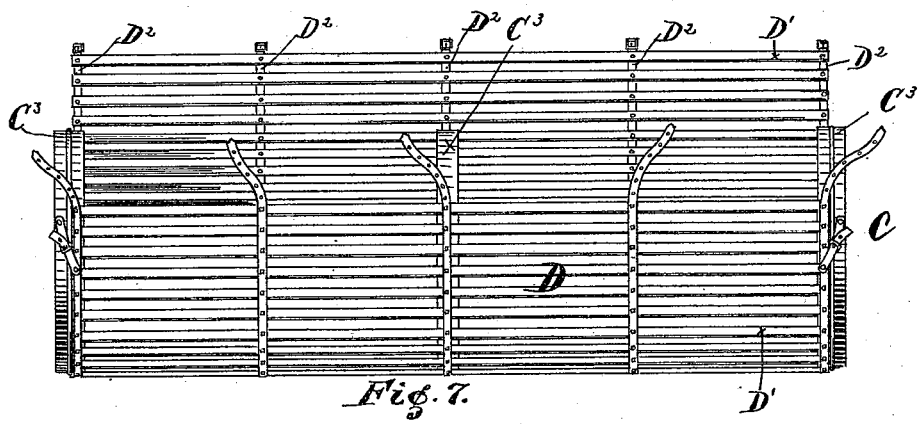
Figure 1:
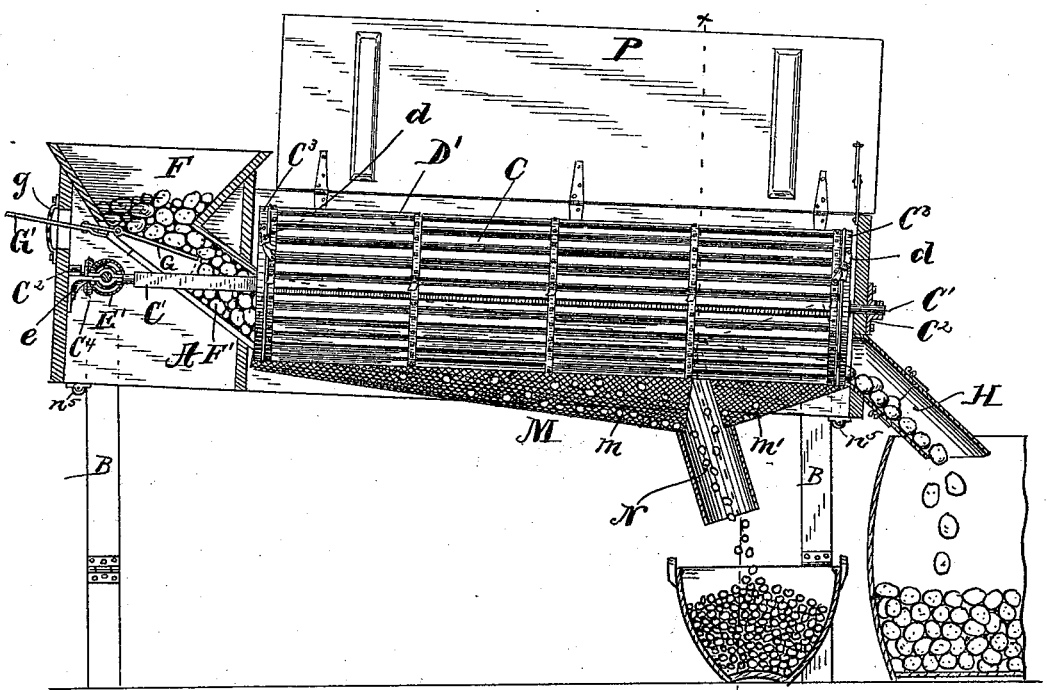
Figure 8:
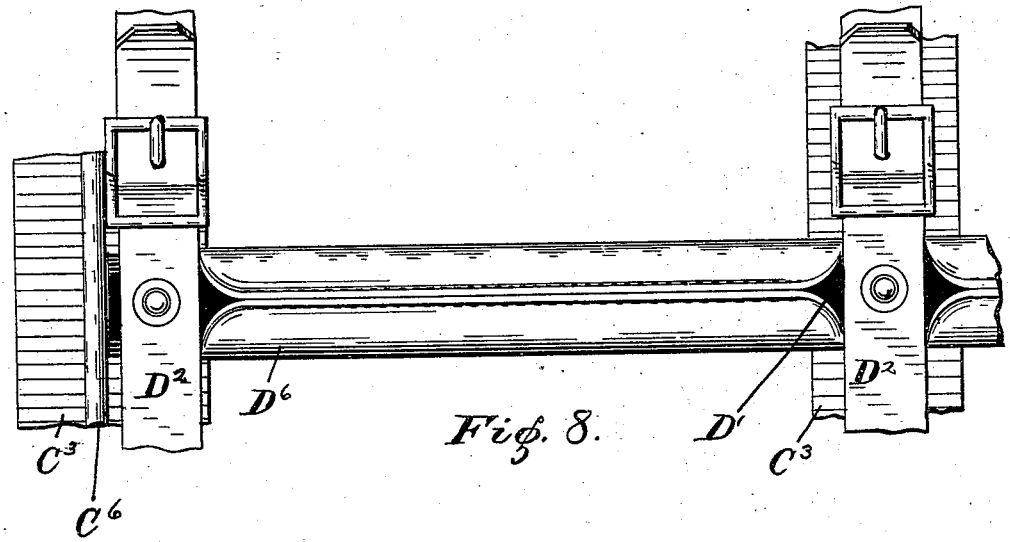
Figure 9:
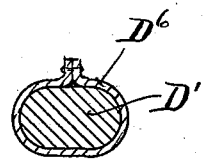

Figure 1 is a view in longitudinal vertical section of my complete machine shown in the operation of sorting potatoes. Fig. 2 is a transverse vertical section through the line $x\,x$, Fig. 1. Fig. 3 is a detail in horizontal section of a portion of the box immediately under the feeding-hopper; Fig. 4, an inside view of the box to contain the revolving screen and showing the attachment and operation of the wire-netting, which is fixed below the screen to catch the articles passed through the screen and convey them to the discharge-pipe; Fig. 5, a transverse section of the box containing the revolving screen on the line $y\,y$. Fig. 6 is a detail in plan view of the valve by which the supply of material to be operated on is regulated; and Fig. 7 is a view in side elevation of the lattice-work covering of the revolving-screen, here shown as removed from the box or case and showing the screen partly uplifted to expose the frame to which it is secured. Fig. 8 is a detail showing one of the screen-strips in enlarged view in order to illustrate the manner of applying the covering of leather. It also shows the bead on the outside band to keep the screen from moving longitudinally. Fig. 9 is a transverse section of one of the covered strips.

Similar letters refer to like parts throughout the several views of the drawings.

A represents the box or case within which the screen is mounted and to which all of the operative mechanism is secured. B are legs, one for each of the four corners of the box, and which form the supports upon which the box will rest. These legs are slightly beveled at the top, and have the ends projected into the loops or bands $b$, whereby the legs are removably secured to the box. The legs will preferably be in two sections hinged together and fastened at the joint by a fastener $b'$ that will lock the legs and prevent their being folded at the joint when so locked. The reason for thus making the legs in two hinged sections is to enable the box A to be lowered so as to be within easy reach when it is desired to change the screen or readjust the parts of the machine inside of the box.

C is a screen which is mounted upon the shaft $C'$, and the shaft $C'$ is supported at each of its ends within and by the journal-bearings $C^2$ of usual construction. The journals $C^2$ are bolted to the ends of the box A. In the construction of the screen $C^3$ are circular bands or rings, which will preferably be made of sheet metal, and $C^7$ are radial arms by means of which the rings are secured to the shaft $C'$, as shown in Fig. 2. The outside rings are provided with the bead $C^6$ to engage the abutting ends of the strips $D'$ and prevent longitudinal movement of the said strips.

D represents a flexible lattice-work construction consisting of wooden slats $D'$, which are fastened together by means of the flexible straps $D^2$ placed on the outside of the strips. The straps $D^2$ will preferably be of leather arranged transversely with relation to the length of the slats and will be bolted or riveted to the slats. This lattice-work will be large enough to reach around the bands $C^3$ and will be secured by uniting the ends of the straps by means of buckles, whereby the slats will be tightly impinged between the metal rings and the straps.

In addition to buckling the lattice-work to the bands the two-part strap $d$, having one part riveted to the outside bands and the other to the slats, and the two parts of the strap united by buckles, will be provided whereby the lattice-work will be held from slipping upon the bands.

The construction as above described will enable the lattice-work to be removed for the purpose of changing the screen to sort larger or smaller articles. By using a series of lattice-work coverings having different-sized openings articles may be sorted into as many different sizes as there are differences in the spacing of the slats in the different screens.

$C^4$ is a beveled cog-wheel fastened to the front end of the shaft $C'$ and engaging the teeth of a similar wheel $E'$ on the transverse shaft E. The inner end of the shaft E will be supported by bracket $e$, which will be either an integral part of the journal-bearing for the end of the shaft $C'$, as shown in the drawings, or it may be a separate bracket. The outer end of the shaft E will pass through the box-bearing $E^3$ fastened to the side of the box, and the shaft will be continued to the outside of the box and will be provided with a crank by means of which the screen will be revolved by turning the crank.

F represents a hopper into which the articles to be sorted are poured, and $F'$ is a chute through which the contents of the hopper are deposited inside of the hollow revolving screen. G is a valve operating within the chute. It consists of a plate hinged to one of the sides of the chute, said plate being within the chute and of suitable size and shape to completely obstruct the passage-way when it is in its closed position. The valve is opened by lowering the plate or swinging it downwardly, and the amount of discharge through the chute is regulated by varying the position of the plate. To place this adjustment within the control of the operator a lever $G'$, secured to the plate and extending to the outside of the box and in a direction from the hinged support opposite to the direction of the plate, is provided. By raising this lever the valve will be opened, and the valve will be closed by lowering the bar.

$g$ is a notched bar alongside the vertical slot. The lever $G'$ is provided with a horizontal adjustment independently of the plate whereby the bar may be shifted horizontally to engage the notches in the bar $g$, thereby locking the plate at any desired position.

The box A will be set at a sufficient incline to cause the articles admitted through the chute $F'$ to roll on through the screen. This action will be assisted by the revolution of the screen. The large articles, those too large to pass between the slats, will finally reach the lower end of the screen and will pass thence through the conveyer pipe or chute H into the barrel or other receptacle placed to receive them. The articles which are small enough to go through the open spaces between the slats will have fallen through before reaching the end of the screen, and to save handling an apron will be provided to catch the articles as they fall and convey them to a chute leading to a suitable receptacle. This apron is shown at M, and for greater convenience will be divided into two parts, $m$ and $m'$, which when set for operation will slope toward each other and will both empty into a common chute. (Shown at N.) This construction saves the crowding together of the outlets for both-sized articles at one end of the machine. In order to allow the dirt which falls through the screen with the small articles to pass through the apron the latter will be constructed of wire-netting.

It is often desirable to transport the machine from one place to another rather than to haul the articles to the machine. For this reason I will prefer to make the proportions of the box A such as will allow it to be placed in a wagon-bed of usual size. For convenience in handling, the legs B are removably secured in the manner previously described, and to facilitate the sliding of the box into the wagon I provide the rollers $n^5$. It is also necessary to provide means for raising the apron M so it will not contact with the wagon-bed, and this I accomplish by the mechanism shown in Figs. 2 and 4, in which the sections are shown as pivotally secured at their outer corners to the sides of the box and the inner ends are secured by means of straps $n'$. The apron is provided with the metallic belts $n^2$ terminating in eyes and the straps terminate in snap-hooks which are made to engage the eyes in the belts. Buckles $n^3$ are fastened to the sides of the box and the straps $n'$ are passed through the buckles, and by this means the apron can be drawn up or lowered, as desired.

P is the lid of the box, which is hinged in the usual way. It should be closed when the machine is in use to prevent the escape of dust raised by the action of the machine.

In a machine for sorting such articles as new potatoes having a delicate skin easily damaged by contact with the hard surface of the slats of the screen I provide a covering, of leather or soft fabric, for each of the slats to act as a cushion.

Having thus fully described my invention, what I claim as new, and wish to secure by Letters Patent, is—

1. In a potato-separator, the combination with a screen constructed of slats joined together by flexible outside straps transverse with relation to the length of the slats, of a revoluble shaft, bands or rings concentric with said shaft and connected therewith by arms, the outside of said rings having a bead on their outer periphery to prevent longitudinal movement of the screen on said rings.

2. A screen having parallel sides and consisting of a central shaft, bands or rings concentric with said shaft, radial arms connecting the rings with the shaft and a removable lattice-work covering consisting of longitudinal strips covered with leather or other soft material joined together by flexible outside straps, said lattice-work being placed around the peripheries of the rings and secured by buckling the ends of the straps together and by buckling the lattice-work to the rings, all substantially as described and specified.

3. The combination with a revolving screen of a two-part flexible apron located under said screen, both of the said parts being pivotally secured at their outer ends and having their inner ends adjustably secured whereby said ends may be raised and lowered substantially as described and for the purposes specified.

In testimony whereof I affix my signature in presence of two witnesses.

JOHN BACH.

Witnesses:
JOSEPH A. MINTURN,
WILL HOFER.